US00RE37134E

(19) United States
(12) Reissued Patent
Wilson

(10) Patent Number: US RE37,134 E
(45) Date of Reissued Patent: Apr. 17, 2001

(54) HEAT EXCHANGER CONTAINING A COMPONENT CAPABLE OF DISCONTINUOUS MOVEMENT

(75) Inventor: David Gordon Wilson, Winchester, MA (US)

(73) Assignee: Massachusetts Institute of Technology, Cambridge, MA (US)

(21) Appl. No.: 08/409,137

(22) Filed: Mar. 23, 1995

Related U.S. Patent Documents

Reissue of:
(64) Patent No.: 5,259,444
Issued: Nov. 9, 1993
Appl. No.: 07/609,362
Filed: Nov. 5, 1990

(51) Int. Cl.[7] ..... F23L 15/02
(52) U.S. Cl. ..... 165/9; 165/10; 165/8
(58) Field of Search ..... 165/104.18, 10, 165/9, 8, 6, 104.15

(56) References Cited

U.S. PATENT DOCUMENTS

| | | | | |
|---|---|---|---|---|
| 2,925,880 | | 2/1960 | Munters | 165/6 |
| 2,965,361 | * | 12/1960 | Schwartz | 165/8 X |
| 3,183,649 | | 5/1965 | Teller | 96/125 |
| 3,216,486 | | 11/1965 | Hall et al. | 165/8 |
| 3,918,516 | * | 11/1975 | Carrasse et al. | 165/6 X |
| 4,057,102 | * | 11/1977 | Guillot | 165/8 |
| 4,360,977 | | 11/1982 | Frohbieter | 34/86 |
| 4,449,573 | | 5/1984 | Pettersson et al. | 165/10 |

FOREIGN PATENT DOCUMENTS

| | | | |
|---|---|---|---|
| 2856184 | 7/1980 | (DE) . | |
| 0235996 | 9/1987 | (EP) . | |
| 2345687 | 10/1977 | (FR) | 165/6 |
| 666889 | 2/1952 | (GB) | 165/6 |
| 917307 | 1/1963 | (GB) | 165/6 |
| 126903 | 12/1949 | (SE) | 165/6 |

OTHER PUBLICATIONS

Cox et al, Inst. Mech. Engrs., Proc. 1950, vol. 163, W.E.P. No. 60, pp 193–205.
Ritchie et al, ASME Paper 74–GT–149, 1974 pp 1–10.
Grossman et al, ASME paper 77–GT–60, 1977 pp 1–4.
McDonald Engr. For Power, vol. 102(2), Apr. 1980 pp 303–314.
Wilson "The Design of High Efficiency Turbo Machinery and Gas Turbines", MIT press 1984, pp 367–395.

* cited by examiner

*Primary Examiner*—Christopher Atkinson
(74) *Attorney, Agent, or Firm*—Cantor Colburn LLP

(57) ABSTRACT

Regenerative heat exchangers are described for transferring heat between hot and cold fluids. The heat exchangers have seal-leakage rates significantly less than those of conventional regenerative heat exchangers because the matrix is discontinuously moved and is releasably sealed while in a stationary position. Both rotary and modular heat exchangers are described. Also described are methods for transferring heat between a hot and cold fluid using the discontinuous movement of matrices.

58 Claims, 6 Drawing Sheets

HEAT EXCHANGER CONTAINING A COMPONENT CAPABLE OF DISCONTINUOUS MOVEMENT

Matter enclosed in heavy brackets [ ] appears in the original patent but forms no part of this reissue specification; matter printed in italics indicates the additions made by reissue.

The Government has rights in this invention pursuant to contract Number De-AC21-89MC26051 awarded by the Department of Energy.

FIELD OF THE INVENTION

This invention is related to regenerative heat exchangers.

BACKGROUND OF THE INVENTION

Heat exchangers are devices used to transfer heat between a hot fluid stream and a cold fluid stream. In conventional heat exchangers the heat is transferred from one stream to another through a wall and the heat transfer is limited by the conductivity of the material of which the wall is made.

Regenerative heat exchangers typically are capable of achieving higher heating temperatures. Regenerative heat exchangers expose a heat-absorbing mass or matrix alternately to a hot stream and to a cold stream. In general, therefore, regenerative heat exchangers have periodic flow.

Periodic-flow exchangers operate differently from conventional fixed-surface heat exchangers in that heat is transferred from the hot fluid to the cold fluid by alternatively heating and cooling a high surface area matrix material. This matrix or core is either rotated through or shuttled back and forth between the hot and cold fluid streams of the fluid streams are switched between or among two or more stationary matrices. One type of periodic flow regenerative heat exchanger is the rotary regenerative heat exchanger in which a heat-absorbing matrix is rotated relative to streams of hot and cold fluids. The matrix generally comprises a disk or drum-shaped body having a plurality of internal passageways oriented axially. The fluid streams flow through these passageways alternately heating the matrix body or extracting heat therefrom. Such rotary heat exchangers are particularly useful as air preheaters in boiler plants and in gas turbine engines. Seals are provided that either have rubbing contact or maintain a very small gap with the matrix and serve to separate the hot and cold streams thereby reducing leakage losses that occur between the hot and cold fluid streams.

Rotary regenerators have advantages that make them well suited for gas-turbine engines. One of these advantages is compactness. In laminar flow of the fluid streams, the volume needed for a given quantity of heat to be transferred is proportional to the square of the hydraulic diameter of the passage used (Wilson, *The Design of High Efficiency Turbomachinery and Gas Turbines,* MIT Press, Cambridge, Mass., 1984). The passages in rotary regenerators for gas-turbine applications can be made much smaller than those of conventional tubular or plate fin type heat exchangers. In tubular or plate fin type heat exchangers, problems can be encountered if the passages are small because deposits from the hot and cold fluids can accumulate and block the small passages. This problem is alleviated or reduced in rotary regenerators because the fluid streams alternate and reverse flow direction in each passage, thereby removing deposits and reducing blockage. In addition, because hot and cold-stream separation is controlled by the seals rather than by complex ducts that are required in recuperators, the cost of making many small passages is low.

Another desirable feature of rotary and other regenerators is low pressure drop. The pumping power required to force gas through a heat exchanger is directly proportional to the square of the Mach number and is rather independent of matrix geometry (Wilson, 1984, cited supra. Therefore, large face areas must be used to minimize fluid velocity. In the rotary and other regenerators, elaborate manifold schemes to interleave the fluids are unnecessary, so a large flow area is practical. In contrast, with fixed surface heat exchangers, achieving both compactness and large, interleaved flow areas simultaneously is more difficult.

A problem encountered with conventional rotary regenerators is leakage of fluid from the exchanger which decreases its efficiency. Leakage occurs either through the seals that separate the high and low-pressure chambers or through void-volume carryover. Void volume carryover occurs because hot high pressure fluid trapped in the matrix is carried through the seals during rotation of the matrix to the cool, low pressure side. This leakage, although relatively small, worsens as the speed of rotation of the matrix increases.

SUMMARY OF THE INVENTION

According to the invention the seal leakage rate of a heat exchanger is reduced by discontinuously moving either the matrix or ducting while releasably isolating portions of the matrix with sealing members. In one embodiment of the invention a regenerative heat exchanger for transferring heat between a hot fluid stream and a cold fluid stream has a matrix defining a first group of passageways for fluid to flow therethrough. A seal means is provided capable of releasably sealing the matrix so that said passageways are interconnected with one of said hot or said cold fluid stream. Means are provided for causing discontinuous movement of the matrix relative to said hot or cold fluid streams and relative to the seal means, and the seal means seals only when said matrix is stationary with respect to said seal means.

Preferably the matrix is a rotary disc. In some cases the means can be formed of two portions comprising modules which are each exposed to hot and cold fluid flows and then exchanged to transfer heat from one flow to the other.

According to a method of this invention heat is transferred between a hot fluid and a cold fluid by establishing a hot fluid stream and a cold fluid stream. A matrix having portions thereof carrying means for exchanging heat with the hot and cold fluid streams is positioned so as to have at least one of said streams exchange heat therewith. The matrix is discontinuously moved in preselected increments such that matrix portions alternately contact the hot fluid and cold fluid streams and carry heat between the hot fluid stream and the cold fluid stream. The matrix is contacted with a seal for at least one of said hot or cold fluid streams when the matrix is stationary with respect to the one stream thereby creating a substantially leakproof area. The seal is released from the matrix when the matrix is moved with respect to the one stream.

Generally, the invention provides an improvement in a method of exchanging heat between a hot fluid stream and a cold fluid stream in a regenerative heat exchanger having a matrix with first and second passageways for said hot and cold fluid streams respectively and said heat exchanger having sealing means to seal said hot and cold streams from each other. The improvement comprises sealing the hot and cold fluid streams from each other to prevent mixing of said fluids when the matrix is stationary with respect to the position of the fluid streams and releasing the seal and moving the matrix with respect to the position of said fluid streams to exchange heat through said matrix.

It is a feature of this invention that the sealing of the matrix during the stationary phase reduces the amount of fluid leaking from one side of the seal to the other which significantly reduces the seal leakage rate.

It is an object of this invention to provide a regenerative heat exchanger that shares the benefits of conventional rotary heat exchangers while significantly reducing the leakage rate of such conventional rotary heat exchangers.

It is another object of this invention to provide a rotary heat exchanger having a matrix capable of discontinuous movement.

It is another object of this invention to provide a modular heat exchanger having matrix modules capable of discontinuous movement.

It is another object of this invention to provide a rotary heat exchanger that shares the benefits of conventional rotary heat exchangers while significantly reducing the leakage rate thereby.

It is another object to provide heat exchangers useful in gas-turbine engines.

It is yet another object to provide heat exchangers that can be integrated within the ducting of systems presently using conventional-type rotary exchangers.

It is still another object of this invention to provide a method of exchanging heat between hot and cold fluid streams by sealing said streams when a heat exchange matrix is stationary with respect to the position of the fluid streams and releasing the seal formed when said matrix moves with respect to said fluid streams.

DETAILED DESCRIPTION

This invention pertains to regenerative heat exchangers for transferring heat between a hot fluid and a cold fluid. The heat exchangers are capable of providing discontinuous movement of a matrix relative to the hot and cold fluid streams. Sealing members are provided to isolate portions of the matrix when the components are stationary and released upon movement. By providing a system that isolates matrix portions only when the matrix is stationary, losses and wear associated with dynamic, sliding seals of conventional, continuously moving regenerative heat exchangers are significantly reduced. Additionally, by providing isolation of matrix portions only when the components are stationary, leakage across the seals that isolate the matrix portions and power losses resulting therefrom can be significantly reduced. The discontinuous movement of the matrix relative to the fluid streams is intended to encompass either discontinuous movement of the matrix or discontinuous movement of the ducting carrying the fluid streams to the matrix. The discontinuous movement preferably is in preselected increments.

In one embodiment of the invention, the heat exchanger has sealing members capable of releasably contacting the matrix surface so that a seal is provided to isolate matrix portions when the matrix or ducting is stationary and released when the matrix is in motion. The sealing members preferably clamp against the matrix to provide a seal having very low leakage when the matrix is stationary.

The regenerative heat exchanger of this invention can be any regenerative heat exchanger that is susceptible to heat and pressure losses resulting from flow leakage through a seal between moving and stationary components. Examples of such regenerative heat exchangers include rotary heat exchangers and modular heat exchangers.

Figure 1A:
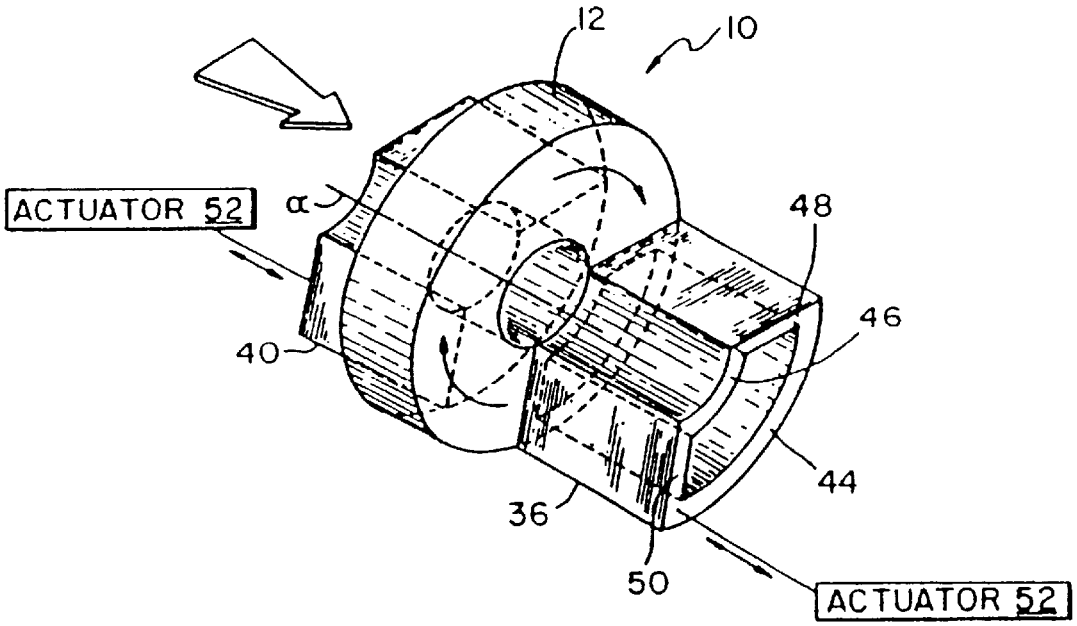
FIG. 1A is a schematic view of a rotary heat exchanger.
Figure 1B:
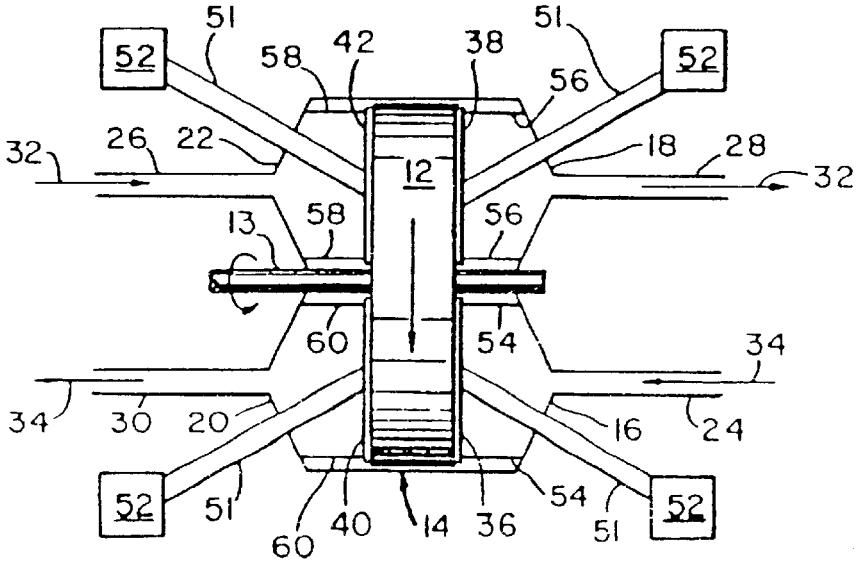
FIG. 1B is a schematic, side view cutaway depicting the rotary heat exchanger contained in a housing.

In a first preferred embodiment, a rotary heat exchanger 10 is used as the regenerative heat exchanger as shown in FIGS. 1A and 1B. The rotary heat exchanger 10 contains an annular matrix 12 provided with a plurality of fluid-flow passageways (not shown) and capable of rotating about a central axis $\alpha$ via a rotor 13. The matrix 12 is contained within a housing 14 conforming to the shape of the matrix 12 in its mid section while having substantially conical portions 16, 18, 20, 22 extending outwardly in pairs on both sides of the housing 14. The conical portions 16, 22 have inlets 24, 26 respectively and conical portions 18, 20 have outlets 28, 30 for connection to the hot fluid stream 32 and the cold fluid stream 34. The rotary heat exchanger also has sealing members 36, 38, 40, 42 positioned on both sides of the matrix 12 for separating the hot fluid stream 32 and the cold fluid stream 34. In this embodiment, the sealing members preferably are shaped to isolate a surface of the matrix being exposed to either the hot or cold fluid stream and are arranged orthogonal to the matrix. Each sealing member preferably comprises a generally annular sector having a pair of arcuate walls 44, 46 connected by a pair of radial walls 48, 52. The surface of each sealing member which faces the fluid inlet 24, 26 or fluid outlet 28, 30 is sealed thereto, preferably using a flexible member 54, 56, 58, 60 to effectively prevent leakage between each sealing member and inlet or outlet. An actuating system 52 is provided for discontinuously moving the sealing members. In one embodiment, the actuating system 52 is connected to a series of rods 51 in communication with sealing members 36, 38, 40, 42, the rods 41 serving via actuating system 52 to move the sealing members toward and away from the matrix 112 at the appropriate time.

In operation, a portion of the matrix 12 is heated as the hot fluid stream 32 flows therethrough. When the matrix is rotated to place the heated portion in contact with the cold fluid stream 34, the heated portion carries heat to the cold fluid which stream 34 flowing through inlet 24. The matrix 12 preferably contains a plurality of internal, axially aligned passageways, (not shown) e.g. such as a honeycomb configuration, through which the hot and cold fluids pass as they travel through the matrix. A portion of the matrix 12 is heated by rotating through the hot fluid and is cooled as it is subsequently rotated through the cold fluid. In so doing, heat is transferred from the hot fluid to the cold fluid to preheat the cool fluid and recycle thermal energy in the system. The matrix 12 is rotated discontinuously in preselected increments, preferably of approximately 20° to approximately 180°.

The sealing members 36, 38, 40, 42 contact the matrix 12 when the matrix is stationary and are released from the matrix when the matrix is moved or just prior to matrix movement. By providing a seal only when the matrix is stationary, a substantially leakproof seal can be achieved and losses and wear associated with sliding, dynamic seals can be substantially reduced or eliminated.

Figure 2A:
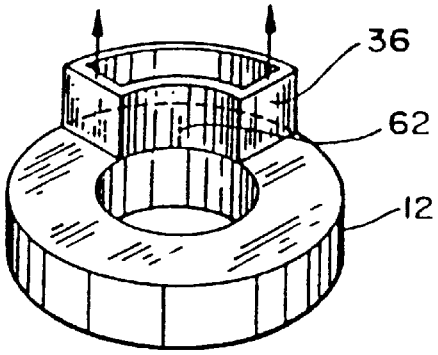
FIGS. 2A–2D schematically show the rotary heat exchanger in operation as the seals are contacting and released from the matrix.
Figure 2B:
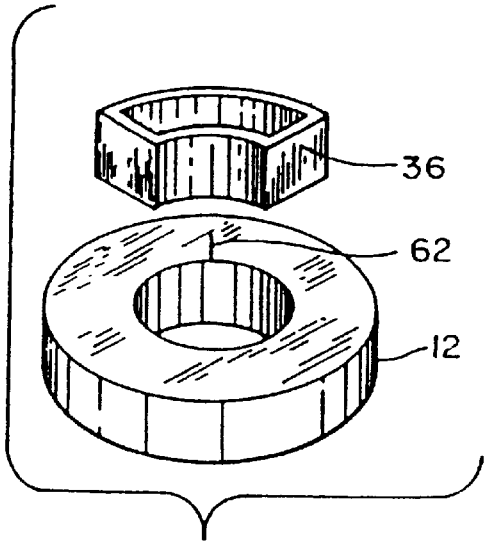
Figure 2C:
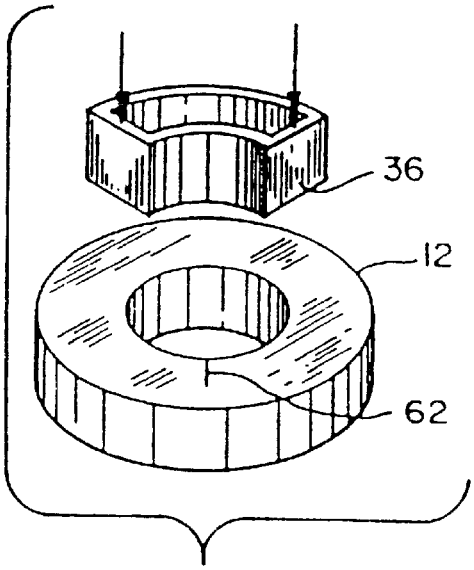
Figure 2D:
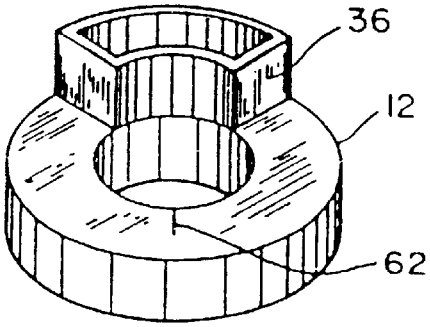

FIGS. 2A–2D depict the operation of a rotary heat exchanger in which the matrix sealing members isolate a matrix portion only when the matrix is stationary. For ease of understanding, only a single sealing member 36 is shown in FIGS. 2A–2D, however it is to be understood that in actual operation a plurality of sealing members as depicted in FIGS. 1A and 1B would be in operation. In FIG. 2A, the sealing member 36 is shown contacting the matrix 12 and reference point 62 is provided to demonstrate the rotation of the matrix 12 during operation. FIG. 2B shows the sealing member 36 released from the matrix 12 and FIG. 2C shows the rotation of the matrix 12 during operation as the reference point 62 moves outside of the matrix region isolated by sealing member 36. It is noted that the sealing member 36 need not be entirely released during the rotation of the matrix 12, but rather may remain in loose contact with the matrix to reduce leakage during the phase in which the matrix is rotated. FIG. 2D shows the sealing member 36 contacting the matrix 12 after the matrix has moved a preselected increment.

Figure 3:
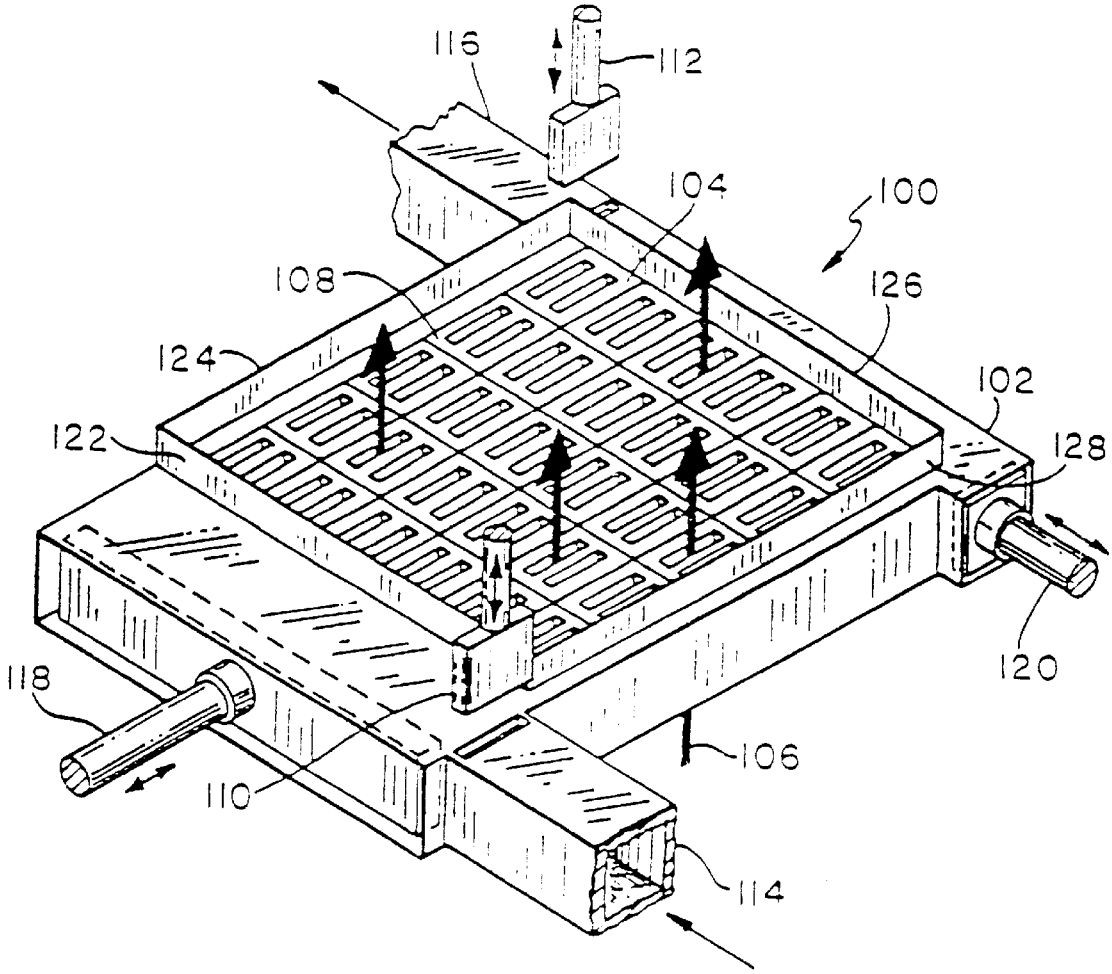
FIG. 3 is a perspective view of a modular heat exchanger.

A second preferred embodiment of the regenerative heat exchanger of the present invention is a modular heat exchanger comprising a pair of modular heat exchange units 100, one of which is depicted in FIG. 3. Each modular heat exchange unit comprises a housing 102 for containing a plurality of heat exchange modules 104. The housing is maintained across a fluid stream 106 which may be either a hot or a cold fluid. A central portion 108 of the heat exchange unit is not enclosed to enable the fluid stream 106 to pass therethrough. A plurality of heat exchange modules 104 are maintained within the central portion 108 and are subject to heating by the fluid stream 106 if the stream is a hot stream, or releasing heat into the fluid stream 106 if the stream is a cold stream. Sealing members 110, 112 can be engaged or disengaged to alternately isolate the modules 104 contained within the housing 102 or to allow rows of modules to be moved into the housing through module inlet 114 and out of the housing through module outlet 116.

Movement of the modules is achieved using a system of linear actuators 118, 120 which serve to transport individual rows or modules through the housing. The activators can be controlled by any of a variety of methods well known in the art, including but not limited to hydraulic means or solenoids.

The housing 102 further includes a plurality of walls 122, 124, 126, 128 which define a path for flow of the fluid stream through and across the housing.

In operation, a plurality of modules are conveyed into the housing through module inlet 114. Once the modules have been conveyed into the housing, the sealing members 110 and 112 are engaged, effectively sealing the module inlet 114 and module outlet 116. A fluid stream 106 is flowed across the housing 102 in the path defined by walls 122, 124, 126, 128 and, in the case of a hot fluid stream, heats the modules contained in the central portion 108 of the housing. The modules contained in the central portion 108 define a heat exchange matrix. After a predetermined time, the sealing members 110, 112 are released and the linear actuator 120 pushes the top row of modules through the module outlet. These modules, heated from their previous residence within the central portion are conveyed to a second identical heat exchange unit through which is flowed a cold fluid stream. Upon contact with that stream, the modules release heat, thereby serving to heat the stream.

Returning to heat exchange unit 100, linear actuator 120 is retracted and linear actuator 118 is advanced, thereby moving each of the module rows within the housing up one row. Actuator 118 is then retracted and a new row of modules is advanced into the housing through the module inlet 114. By connecting the module outlet of a first exchange unit with the module inlet of a second exchange unit and the module inlet of the first unit with the module outlet of the second exchange unit, a module circuit is defined.

Figure 4A:
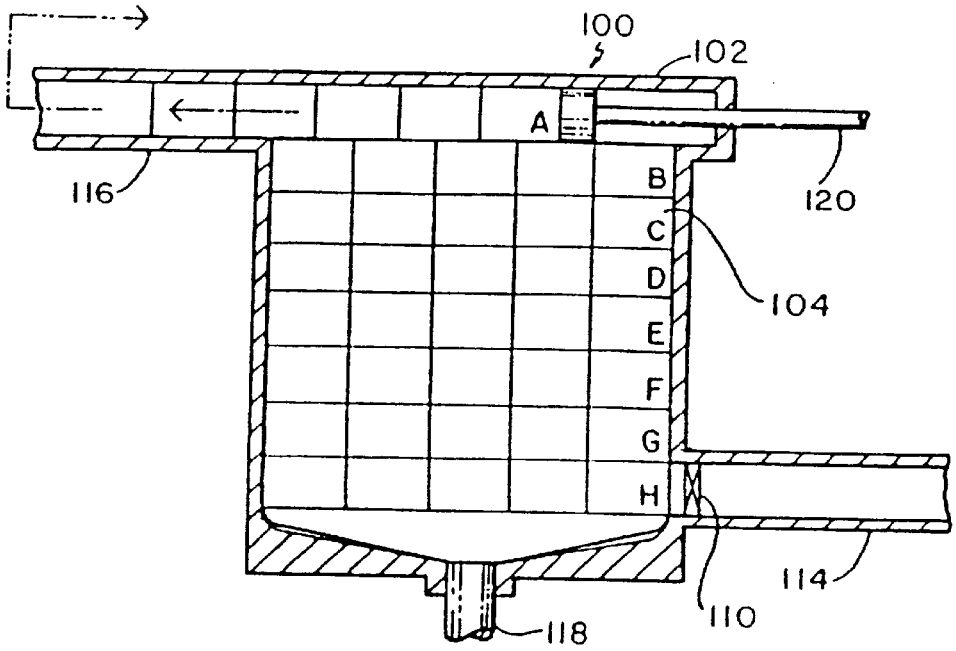
FIGS. 4A–4C show the modular heat exchanger in operation as the modules move through a cycle within the housing.
Figure 4B:
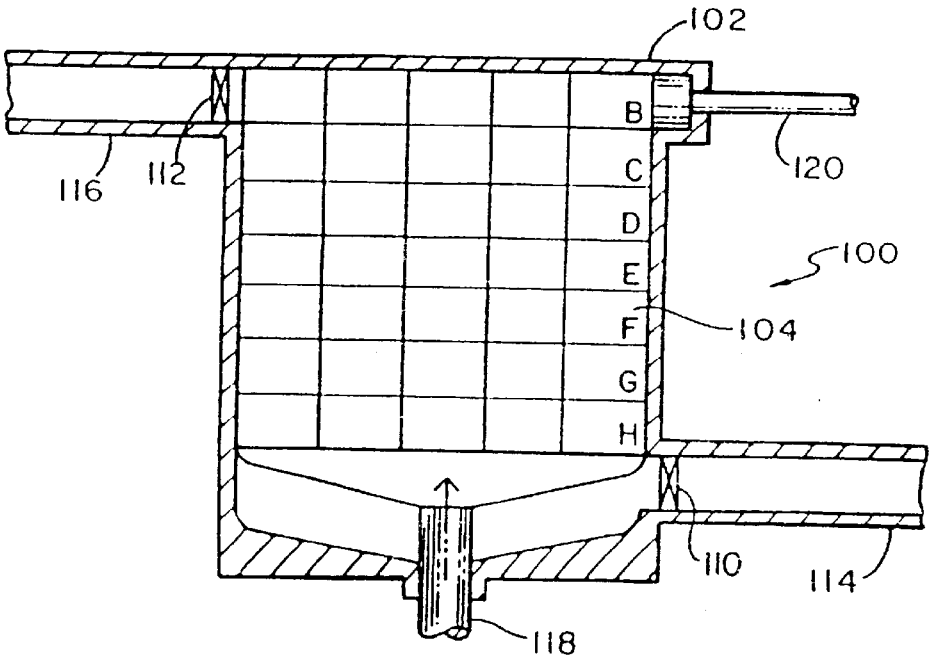
Figure 4C:
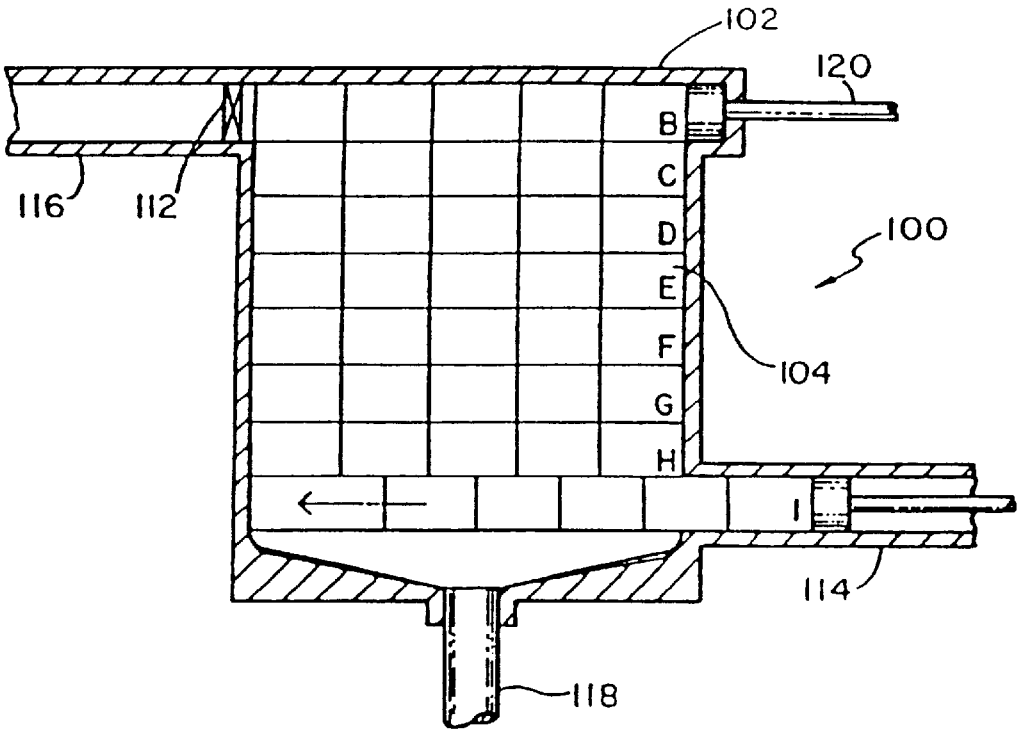

FIGS. 4A–4C depict the movement of the modules 104 during operation of the modular heat exchanger. In FIG. 4A, the housing 102 is full of modules and a linear actuator 120 is moving the top row of modules (labeled A) horizontally to the left providing space for upward movement of modules (contained in rows labelled B–H). In FIG. 4B, a linear actuator is moving the modules of rows B–H in a vertical direction providing space for an incoming row modules (labelled I) to enter the housing 102 as shown in FIG. 4C.

Figure 5:
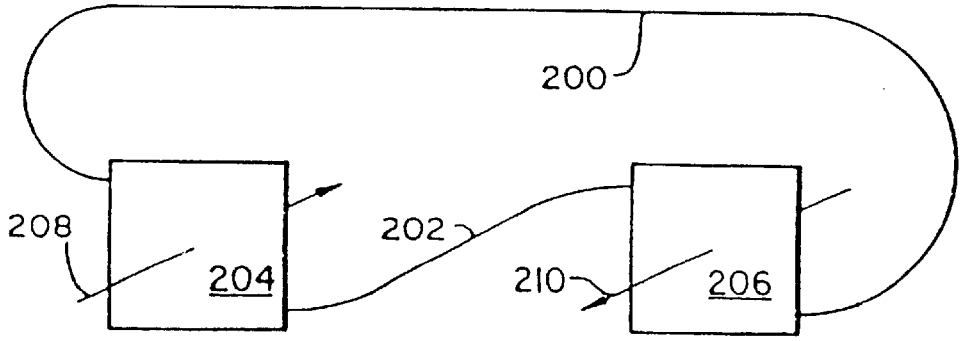
FIG. 5 is a schematic representation of a heat exchange system using modular heat exchangers.

When using the modular heat exchanger system, one modular heat exchange unit 100 would be used for the hot fluid stream and a second modular heat exchange unit 100 would be used for the cold fluid stream. As depicted schematically in FIG. 5, heat exchange modules are conveyed along paths 200, 202 between the separate heat exchanger units 204, 206 in the system, first contacting the hot fluid stream 208 before being conveyed to the cold fluid stream 210. Thus, in the example described previously, the heated modules would be transferred from a first heat exchange unit to a second heat exchange unit, and a fluid would be passed through the modules to either heat the modules or to extract heat therefrom. Heated modules would be cycled to lie in the path of the cold fluid stream and cooled modules would be cycled to lie in the path of the hot fluid stream.

The matrix is designed to accommodate the particular type of regenerative heat exchanger chosen. For example, an annular matrix can be used in a rotary heat exchanger. Alternatively, if a modular heat-exchanger system is used, the matrix comprises a plurality of separate heat exchange modules.

The individual modules are of a shape that can arrange to fit into a housing. In a preferred embodiment, the modules are rectangular, allowing them to be arranged in the housing in a symmetrical manner.

The matrix is fabricated from a material capable both of allowing fluid flow therethrough and withstanding the temperature and pressure conditions of the hot fluid stream. Examples of such materials include metals, stainless steels, ceramics, heat resistant cast alloys, refactory materials, thoria-disbursed alloys, graphite and carbon-fiber-reinforced carbon-based materials. The term ceramic is intended to include glass ceramic, silicon carbide, silicon nitride and many others. Examples of metals for high temperature regeneration include nickel-chromium-cobalt beryllium alloy.

Figure 6:
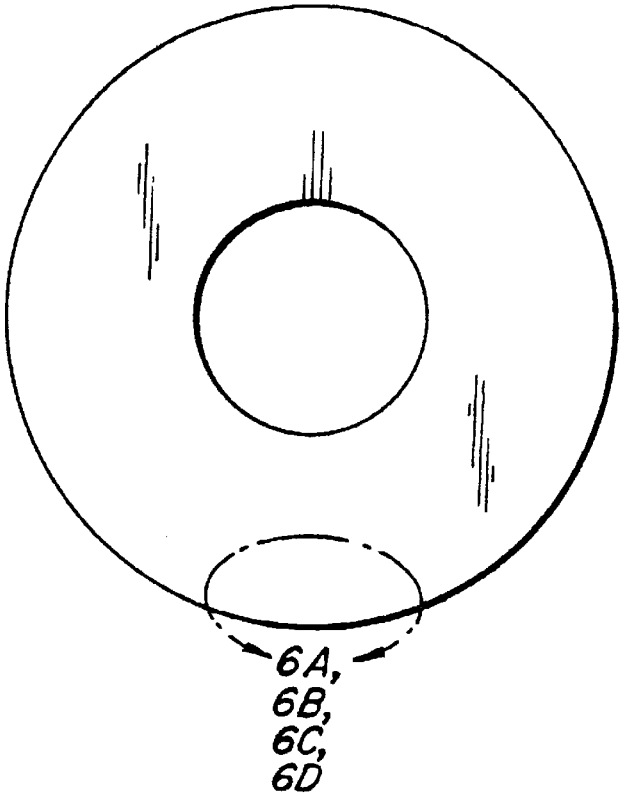
*FIG. 6 is a side elevation view of a rotary heat exchanger.*
Figure 6A:
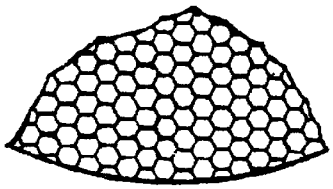
*FIGS. 6A–D are schematic, side elevation views of honeycomb, corrugated, egg crate and grid matrices, respectively, taken along the lines 6A, 6B, 6C and 6D of FIG. 6.*
Figure 6B:
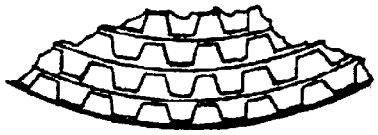
Figure 6C:
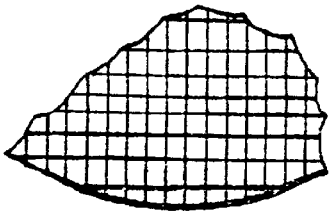
Figure 6D:
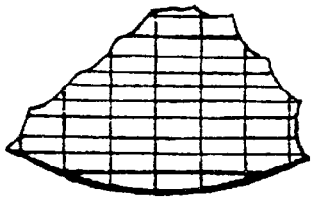

The configuration of the matrix is of a form that allows fluid to flow through the matrix. Preferred configurations include porous matrices with barriers to prevent transverse flow, or a matrices having internal passageways directed in the direction of fluid flow. Examples of such configurations include honeycombs (*see FIG. 6A*), corrugated portions (*see FIG. 6B*), "egg crate" portions (*see FIG. 6C*), and wire grids (*see FIG. 6D*).

The matrix can be moved discontinuously using mechanisms that are art-recognized. For the rotary heat exchanger, the matrix can be carried on a rotor and moved discontinuously using a mechanical mechanism such as a Geneva-drive. Alternatively, a stepping motor or electronic control device can be used to provide the discontinuing rotation.

In a modular system, the modules are moved discontinuously using linear actuators arranged to provide movement in both the vertical and horizontal directions. Linear actuators are art-recognized and can be comprised of hydraulic or air-piston actuators, mechanical actuators or electromagnetic devices such as solenoids.

The sealing members of this invention can be made of any material capable of sealing against fluid leakage and surviving the temperature and pressure conditions of the system. Examples of such materials include graphite, metals, ceramics and pressed carbon. It should be understood that some materials can be appropriate for the hot side of the matrix receiving the hot fluid, e.g., stainless steel or another high-temperature metal, and other materials can be appropriate for the side receiving the cold fluid, e.g., graphite. In a rotary heat exchanger, the sealing members can be arranged such that they contact the matrix leaving about one half to three fourths of the surface area of the matrix for contacting the hot fluid and about one-fourth to one half of the surface area of the matrix for contacting the cold fluid.

In one embodiment of operation, the sealing members are clamped to the matrix when it is stationary and released when the matrix is in motion as shown in FIGS. 2A–2C for rotary heat exchangers. The clamping action of the sealing members can be provided by a variety of art recognized mechanisms. One example of such a mechanism includes a differential-pressure system in which pressure is used to press the seal against the matrix. Another mechanism that can be used is that having a piston and bellows for pushing the seal against the matrix as described in Cox et al., Internal Combustion Turbines, pp 193–205; particularly see FIG. 12, the contents of which are hereby expressly incorporated by reference.

The clamping action of the sealing members is provided when the sealing members are either contacting or are very close to the matrix, e.g. within 0.001" of the matrix surface. Seals for rotary heat exchangers have been movable or slidable in the prior art but such prior art seals were dynamic seals which followed the contour of the matrix surface as the matrix was rotated. Prior art seals have not been provided with the clamping action of the present invention.

The seal leakage rate is the amount of fluid that leaks through or across the seal. It is generally stated as a proportion or percentage of the higher-pressure flow. This rate can be determined directly by capturing the escaping fluid around the seal or by measuring and comparing the flow of fluid going into one side of the heat exchanger against the flow of fluid coming out the other side of the heat exchanger. Conventional rotary heat exchangers in small gas turbines have a seal leakage rate generally in the range of 2–10%. The rotary heat exchangers of the present invention can have seal-leakage rates as low as about 0.5%.

The housing and ducting of the heat exchanger can be made of a material capable of withstanding the heat and pressure requirements of the system. Examples of such materials for gas-turbine applications include stainless steel, ceramics and aluminum.

This invention also pertains to methods for transferring heat between a hot fluid and a cold fluid. The methods can be conducted using the heat exchangers discussed above. In the method, the matrix or ducting is discontinuously moved in preselected increments. Portions of the matrix are isolated by the sealing members when the matrix or ducting is stationary creating a substantially leakproof environment and the sealing members is released from the matrix when the matrix or ducting is moved or just prior to movement. The discontinuous movement and contacting steps are preferably repeated a plurality of times.

The movement in preselected increments can be either a rotary movement when the method is being conducted using a rotary heat exchanger or a linear increment when the method is being conducted using a modular heat exchanger. In a rotary system, the preselected increments are typically between 20° and 120° of rotation. In a modular system, the preselected increments are typically equal to the distance required to move a single row of modules into the heat exchanging section.

The fluids of this invention can include liquids and gases, but the invention is preferably directed at heat exchangers useful for exchanging heat between gas streams.

The benefit derived from using the method of the present invention is the creation of a regenerator having substantially reduced flow leakage. A substantially leakproof environment is an environment in which there is no leakage or the leakage is significantly reduced, e.g. to a value of approximately 5%–20% of that currently achieved using conventional regenerative heat exchangers.

EQUIVALENTS

Those skilled in the art will be able to ascertain using no more than routine experimentation, many equivalents of the specific embodiments of the invention described herein.

These and all other equivalents are intended to be encompassed by the following claims.

I claim:

1. A regenerative heat exchanger for transferring heat between a hot fluid stream and a cold fluid stream, said heat exchanger comprising, a first matrix comprising a first plurality of modules, a second matrix comprising a second plurality of modules, means for providing a first discontinuous movement of said modules within each of said first and said second matrices, means for directing said hot fluid stream to said first mentioned matrix and said cold fluid stream to said second matrix, each of said fluid streams being substantially perpendicular to the direction of said first discontinuous movement, means for providing a second discontinuous movement of said modules from said first mentioned matrix to said second matrix, and seal means positioned to seal said hot fluid stream from said cold fluid stream when said modules are stationary and being releasable to permit movement of said modules.

2. A regenerative heat exchanger as claimed in claim 1 wherein the matrix is fabricated of a material selected from a group consisting of metals, stainless steels, ceramics, heat-resistant cast alloys, refractory materials, thoria-dispersed alloys, graphite, and carbon-fiber-reinforced carbon-base materials.

3. A regenerative heat exchanger as claimed in claim 2 wherein the matrix is fabricated of a material having a honeycomb configuration.

4. A regenerative heat exchanger as claimed in claim 3 wherein the matrix is a ceramic honeycomb.

5. A regenerative heat exchanger as claimed in claim 4 wherein the ceramic is a glass ceramic.

6. A regenerative heat exchanger as claimed in claim 4 wherein the ceramic is silicon carbide or silicon nitride.

7. A regenerative heat exchanger as claimed in claim 4 wherein the ceramic is silicon oxide.

8. A regenerative heat exchanger as claimed in claim 1 wherein the hot and cold fluids each comprise a gas.

9. In a method of exchanging heat between a hot fluid steam and a cold fluid stream in a regenerative heat exchanger having a matrix with first and second passageways for said hot and cold fluid streams respectively and said heat exchanger having sealing means to seal and hot and cold streams from each other, the improvement comprising, sealing said hot and cold fluid streams from each other to prevent mixing of said fluids when said matrix is stationary with respect to the position of said fluid streams, and releasing said seal and moving said matrix with respect to the position of said fluid streams, said movement being at least partially linear and further being in a direction perpendicular to the direction to said fluid streams.

10. The improvement of claim 9 wherein said regenerative heat exchanger has a first group of heat exchange modules and a second group of heat exchange modules forming said matrix and said method further including the step of moving said modules from said first group to said second group and vice versa.

11. The improvement of claim 10 and further comprising, said matrix comprising a porous material, and establishing said hot and cold fluid streams through respective first and second portions of said matrix, and incrementally moving said matrix to reciprocate said first and second portions with respect to said hot and cold fluid streams.

*12. A regenerative heat exchanger for transferring heat between a hot fluid stream and a cold fluid stream, said heat exchanger comprising:*

*a matrix, a portion of said matrix being maintained in either one of said hot or cold fluid streams while said portion undergoes a plurality of discontinuous movements; and*

*a seal for discontinuously sealing said hot fluid stream from said cold fluid stream in synchronization with said discontinuous movements of said portion of said matrix wherein said portion of said matrix is sealed when said portion is stationary.*

*13. A regenerative heat exchanger as claimed in claim 12 wherein said matrix comprises a rotary matrix.*

*14. A regenerative heat exchanger as claimed in claim 13 wherein said rotary matrix comprises a disk and said portion comprises a segment of said disk.*

*15. A regenerative heat exchanger as claimed in claim 12 wherein said matrix comprises a plurality of modules and said portion of said matrix comprises at least one of said modules.*

*16. A regenerative heat exchanger as claimed in claim 15 wherein:*

*said modules travel linearly within said matrix.*

*17. A regenerative heat exchanger as claimed in claim 15 wherein said matrix includes a face and wherein:*

*said modules travel linearly and perpendicularly across said face.*

*18. A regenerative heat exchanger as claimed in claim 12 wherein said hot fluid stream flows in a conduit.*

*19. A regenerative heat exchanger as claimed in claim 12 wherein said cold fluid stream flows in a conduit.*

*20. A regenerative heat exchanger as claimed in claim 12 wherein said movements are unidirectional.*

*21. A regenerative heat exchanger as claimed in claim 13 wherein said seal comprises an annular sector having substantially arcuate walls connected by a pair of radial walls, said seal being arranged orthogonal to the matrix.*

*22. A regenerative heat exchanger as claimed in claim 21 wherein said seal functions in conjunction with an actuator system.*

*23. A regenerative heat exchanger as claimed in claim 22 wherein said actuator system includes a series of actuating members in operable communication with the seal.*

*24. A regenerative heat exchanger as claimed in claim 12 wherein said seal is retracted from said matrix during movement.*

*25. A regenerative heat exchanger as claimed in claim 12 wherein said discontinuous movement is carried out in similar increments.*

*26. A regenerative heat exchanger as claimed in claim 13 wherein said discontinuous movements are in increments in the range of about 20° to about 120° of rotation.*

*27. A regenerative heat exchanger as claimed in claim 12 wherein said matrix is constructed of a material selected from a group consisting of metals, stainless steels, ceramics, heat-resistant cast alloys, refractory materials, thoria-dispersed alloys, graphite, and carbon-fiber-reinforced carbon-based materials.*

*28. A regenerative heat exchanger as claimed in claim 13 wherein said matrix has a configuration selected from the group consisting of honeycomb, corrugated, egg crate or grid.*

*29. A regenerative heat exchanger as claimed in claim 12 wherein said matrix is rectangularly shaped.*

*30. A regenerative heat exchanger as claimed in claim 29 wherein said exchanger comprises two rectangularly shaped matrices.*

*31. A regenerative heat exchanger as claimed in claim 30 wherein said matrices are each composed of a plurality of modules.*

*32. A regenerative heat exchanger as claimed in claim 31 wherein said modules are arranged in rows with said rows being moved in incremental discontinuous movements.*

*33. A regenerative heat exchanger as claimed in claim 17 wherein said modules are arranged in rows and each of said rows comprises at least one module.*

*34. A regenerative heat exchanger as claimed in claim 16 wherein said modules define transverse through passages for flow through of fluids, said modules including heat absorptive and releasing properties.*

*35. A regenerative heat exchanger as claimed in claim 12 wherein said seal provides a leak rate in the range of about 2% to about 10%.*

*36. A regenerative heat exchanger as claimed in claim 35 wherein said leak rate is in the range of about 0.5% to about 10%.*

*37. A regenerative heat exchanger for exchanging thermal energy between a conduit containing a hot fluid and a conduit containing a cold fluid, said exchanger comprising:*

*a) a matrix divided into a plurality of discrete portions; and*

*b) at least one seal for releasably sealing to said matrix for preventing leaking of said fluid wherein each of said discrete portions of said matrix are maintained in said hot or cold fluid for a predetermined plurality of discontinuous movements, said seal discontinuously sealing said hot fluid from said cold fluid in synchronization with said discontinuous movements.*

*38. A regenerative heat exchanger as claimed in claim 37 wherein each of said discrete portions of said matrix after*

*being maintained in one of said hot or cold fluids for a predetermined plurality of discontinuous movements is expelled from said hot or cold fluid and maintained in the other of said hot or cold fluids for a predetermined plurality of discontinuous movements.*

*39. A regenerative heat exchanger having a matrix sequentially positionable within at least one higher temperature environment and at least one lower temperature environment wherein said sequential positioning is discontinuous and maintains each of a plurality of discrete portions of said matrix in one of said higher temperature environment and lower temperature environment for a predetermined number of discontinuous movements and a seal which discontinuously seals said higher temperature environment from said lower temperature environment in synchronization with said discontinuous movements.*

*40. A regenerative heat exchanger comprising:*

*a matrix having a plurality of discrete portions, said matrix being disposed simultaneously in at least one lower temperature environment and at least one higher temperature environment in distinct respective areas of said matrix, each of said respective areas encompassing a plurality of discrete portions moveable in a stepwise manner such that any particular discrete portion remains in one of said lower temperature environment and said higher temperature environment for in excess of one stepwise movement and a seal which discontinuously seals said higher temperature environment from said lower temperature environment in synchronization with said stepwise movements.*

*41. In a method of exchanging heat between at least one hot fluid steam and at least one cold fluid stream in a regenerative heat exchanger having a matrix with first and second passageways for said hot and cold fluid streams respectively and said heat exchanger having sealing means to seal said hot and cold streams from each other, the improvement comprising:*

*maintaining a portion of said matrix in either of said hot or cold fluid stream while said portion undergoes a plurality of discontinuous movements;*

*discontinuously sealing said hot fluid stream from said cold fluid stream in synchronization with said discontinuous movements of said portion of said matrix wherein said portion of said matrix is sealed when said portion is stationary;*

*sealing said hot and cold fluid streams from each other to prevent mixing of said fluids in synchronization with said discontinuous movements of said portion of said matrix wherein a seal is achieved when said matrix is stationary with respect to the fluid streams and wherein said seal is released when said matrix is moving.*

*42. The method of claim 41 wherein said regenerative heat exchanger has a first group of heat exchange modules and a second group of heat exchange modules forming said matrix and said method further including the step of moving said modules from said first group to said second group and vice versa.*

*43. The method of claim 41 wherein said matrix comprises a porous matrix and further comprising the steps of:*

*establishing said hot and cold fluid streams through respective first and second areas of said matrix; and*

*incrementally moving said matrix between said first and second areas.*

*44. A method for transferring heat between a hot fluid and a cold fluid, said method comprising:*

*establishing at least one hot fluid stream and at least one cold fluid stream;*

*positioning a matrix for exchanging heat with said hot and cold fluid streams;*

*discontinuously moving said matrix in preselected increments such that discrete matrix portions contact said hot fluid and cold fluid streams for a preselected plurality of increments and carry heat between said hot fluid stream and said cold fluid stream;*

*contacting said matrix with a seal for at least one of said hot or cold fluid streams when said matrix is stationary with respect to said one stream; and*

*releasing the seal from the matrix when the matrix is moved.*

*45. A method as claimed in claim 44 wherein the discontinuous movement and contacting steps are repeated a plurality of times.*

*46. A method as claimed in claim 44 wherein the discontinuous movement is a discontinuous rotation.*

*47. A method as claimed in claim 44 wherein the discontinuous movement is a linear movement.*

*48. A method as claimed in claim 46 wherein the preselected increments are about 20° to about 120° increments.*

*49. A method as claimed in claim 44 wherein one of said hot or cold fluid streams defines a high pressure fluid and one of said hot or cold fluid streams defines a low pressure fluid and wherein a first surface area of said matrix contacting the high pressure fluid is less than a second surface area of said matrix contacting the low pressure fluid.*

*50. A method as claimed in claim 44 wherein the matrix is fabricated of a material selected from a group consisting of metals, stainless steels, ceramics, heat-resistant cast alloys, refractory materials, thoria-dispersed alloys, graphite, and carbon-fiber-reinforced carbon-based materials.*

*51. A method as claimed in claim 50 wherein the matrix being discontinuously moved has a configuration selected from the group consisting of honeycomb, corrugated, egg crate or grid.*

*52. A method as claimed in claim 50 wherein the ceramic is a glass ceramic.*

*53. A method as claimed in claim 50 wherein the ceramic is carbide or nitride.*

*54. A method as claimed in claim 50 wherein the ceramic is oxide.*

*55. A regenerative heat exchanger as claimed in claim 44 wherein the hot and cold fluids each comprise a gas.*

*56. A regenerative heat exchanger for transferring heat between a hot fluid stream and a cold fluid stream, said heat exchanger comprising:*

*a first matrix comprising a first plurality of modules;*

*a second matrix comprising a second plurality of modules;*

*means for providing a first discontinuous movement of said modules within each of said first and said second matrices;*

*means for directing said hot fluid stream to said first matrix and said cold fluid stream to said second matrix;*

*means for providing a second discontinuous movement of said modules from said first matrix to said second matrix;*

*seal means positioned to seal said hot fluid stream from said cold fluid stream when said modules are stationary and being releasable to permit movement of modules;*

*a portion of said first matrix being maintained in said hot fluid stream while said portion undergoes a plurality of said first discontinuous movements; and*

*a portion of said second matrix being maintained in said cold fluid stream while said portion undergoes a plurality of said second discontinuous movements.*

*57. In a method of exchanging heat between a hot fluid stream and a cold fluid stream in a regenerative heat*

*exchanger having a matrix with first and second passageways for said hot and cold fluid streams respectively and said heat exchanger having sealing means to seal said hot and cold streams from each other, the improvement comprising the steps of:*

*sealing said hot and cold fluid streams from each other to prevent mixing of said fluids when said matrix is stationary with respect to the position of said fluid streams;*

*releasing said seal and moving said matrix with respect to the position of said fluid stream; and*

*maintaining a portion of said matrix in either said hot or cold fluid stream while said portion undergoes a plurality of discontinuous movements.*

*58. The improvement of claim 57 wherein said regenerative heat exchanger has a first group of heat exchange modules and a second group of heat exchanger modules forming said matrix and said method further including the step of moving said modules from said first group to said second group and vice versa.*

* * * * *